United States Patent [19]
Tanaka

[11] Patent Number: 6,015,319
[45] Date of Patent: Jan. 18, 2000

[54] CONTROL FOR MARINE PROPULSION

[75] Inventor: Ko Tanaka, Hamamatsu, Japan

[73] Assignee: Sanshin Kogyo Kabushiki Kaisha, Hamamatsu, Japan

[21] Appl. No.: 08/992,880

[22] Filed: Dec. 18, 1997

[30] Foreign Application Priority Data

Dec. 18, 1996 [JP] Japan ..................................... 8-338441

[51] Int. Cl.[7] ................................................. B60K 41/00
[52] U.S. Cl. .................................. 440/84; 440/2; 440/900
[58] Field of Search ............................. 440/1, 2, 84, 85, 440/86, 88, 87, 900

[56] References Cited

U.S. PATENT DOCUMENTS

5,314,362  5/1994  Nagahora ................................. 440/84

*Primary Examiner*—Stephen Avila
*Attorney, Agent, or Firm*—Knobbe, Martens, Olson & Bear LLP

[57] ABSTRACT

The invention relates to an engine control system for an internal combustion engine for propulsion of an associated watercraft. The engine includes an air intake in communication with a combustion chamber of the engine and an air intake adjustment means for altering the amount of air let into the combustion chamber of the engine. There is also an operation device controlling a water propulsion device of the watercraft. The device is movable between a forward, a neutral or a reverse position. A first control means for controls the air intake adjustment means based upon the position of the movable operating device. A second control means controls the air intake adjustment means independent of the first control means based upon a set of predetermined conditions.

22 Claims, 7 Drawing Sheets

CONTROL FOR MARINE PROPULSION

FIELD OF THE INVENTION

The present invention relates to an engine control. More particularly, the present invention is an engine control in which the air intake to the combustion chambers is altered during one or more operating conditions.

BACKGROUND OF THE INVENTION

It is well known that watercraft are typically powered by outboard motors that drive a propulsion device which in turn propel a watercraft through the water. These outboard motors are typically powered by an engine of the internal combustion variety. The engine includes an air intake which communicates with each combustion chamber of the engine.

It is common to position a throttle plate within the air intake. The throttle plate is typically arranged to move between open and closed positions, thereby altering the cross-sectional area of a passage through the air intake. This in turn changes the volume of air which is permitted to flow through the air intake to the combustion chamber(s) of the engine.

Also well known in the art is that the position of the throttle plate is controlled, either directly or through an engine control module, by an operation device located on the motor, or more preferably, the watercraft. Such an operation device may comprise a combined throttle and transmission control for the watercraft. Typically, the position of the operation device correlates to a certain opening position of the throttle plate. At each position of the operation device, the throttle plate is thus at a certain position allowing a given amount of air is allowed to flow through the engine, which in turn allows the engine to operate at a given engine speed.

There are certain operating conditions, however, where the throttle position set by the position of the operation device will not produce the desired engine speed for the load placed upon the engine. For instance, when the operation device is positioned in a forward position the engine typically is operating under a given speed and there is a set amount of torque on the propulsion device. When the operation device is moved from a mode of operation in the forward position to a mode of operation in the reverse position, the position of the throttle plate will not correlate to the load on the engine caused by the propulsion device.

A more specific example is when the operator of the watercraft uses the motor to slow the watercraft. The operation device is positioned in a forward position and then the operator shifts the operation device to the rearward position or to a neutral position. In this case, the throttle plate may be positioned so that the air intake member is completely closed. The load on the engine, however, does not correlate with the position of the throttle plate and subsequently the engine may bog down or even stall entirely.

Another situation where the load on the engine will not correlate with the position of the throttle plate is when the operation device is moved from a rearward to a forward position. In this position, the throttle plate position will not correlate with the load placed on the engine and therefore the engine may subsequently bog down or even stall.

Yet another situation where the load on the engine will not correlate with the position of the throttle plate as set by the operation device is when the operator shifts either from a forward position to a reverse position at a high rate of speed. Once again, the engine may be overloaded and may bog down or stall.

Still another situation where the load on the engine will not correlate with the position of the throttle plate as set by the operation device is when the watercraft is in a trolling mode and the operator suddenly shifts either from forward to reverse or from reverse to forward. As before, the engine may be overloaded and may bog down or stall.

It is therefore a present object of the invention to prevent the bogging down or stalling of the engine of the watercraft under all of the situations of operation as listed above.

SUMMARY OF THE INVENTION

The present invention is an engine control system for an internal combustion engine which is arranged to power a water propulsion device of an associated watercraft. The engine includes an air intake in communication with a combustion chamber of the engine. The engine control includes an air intake adjustment means for altering the amount of air permitted to flow to each combustion chamber of the engine and an operation device controlling a water propulsion device of the watercraft. The device is preferably movable between a forward, a neutral or a reverse position. There is also a first control means for controlling the air intake adjustment means based upon the position of the movable operating device. Further, there is a second control means for controlling the air intake adjustment means independent of the first control means based upon a set of predetermined conditions.

Further objects, features and advantages of the present invention over the prior art will become apparent from the detailed description of the drawings which follows, when considered with the attached figures.

DETAILED DESCRIPTION OF THE PREFERRED EMBODIMENTS OF THE INVENTION

Figure 1:
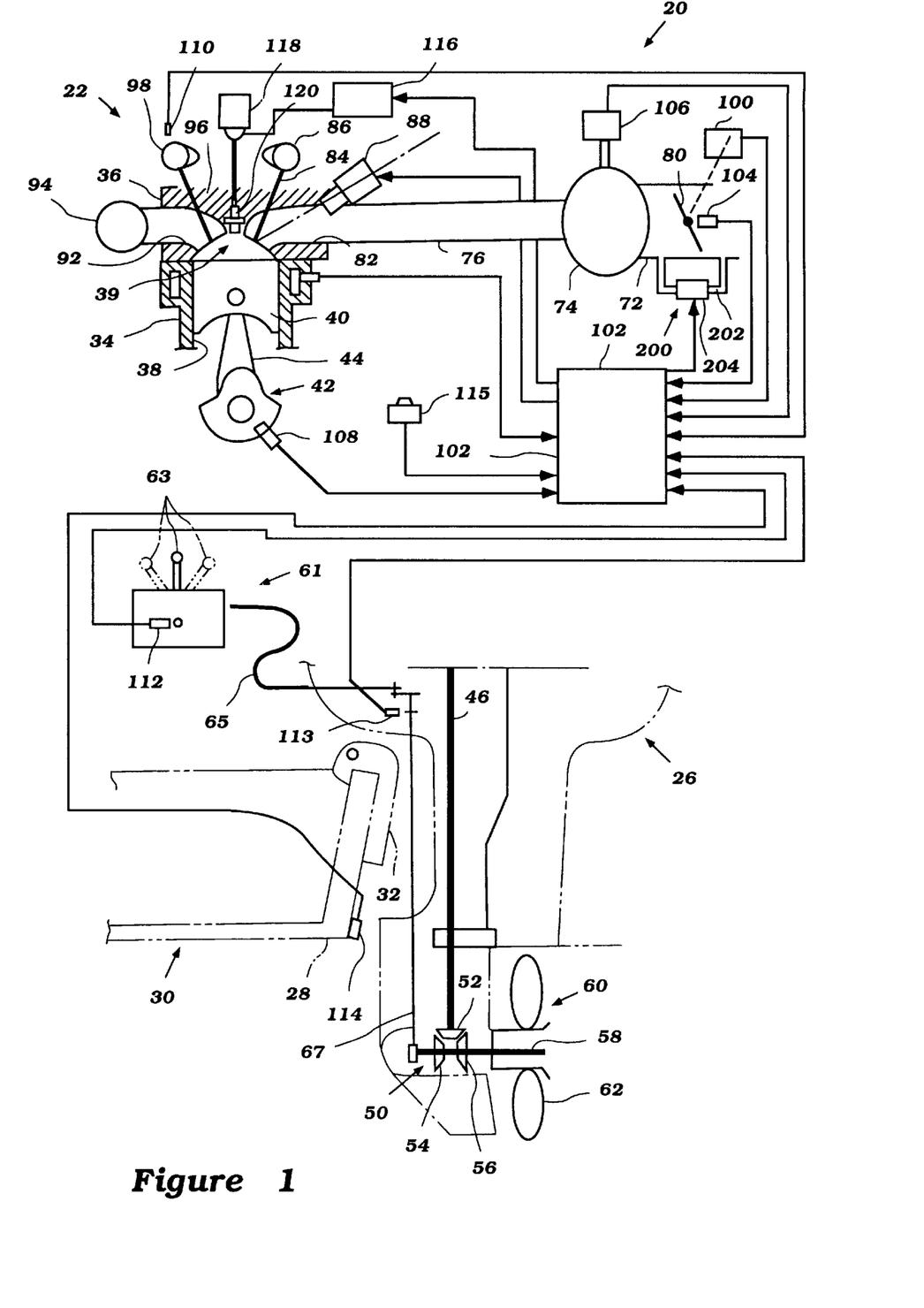
FIG. 1 schematically illustrates an engine powering an outboard motor having an engine control system in accordance with the present invention.
Figure 2:
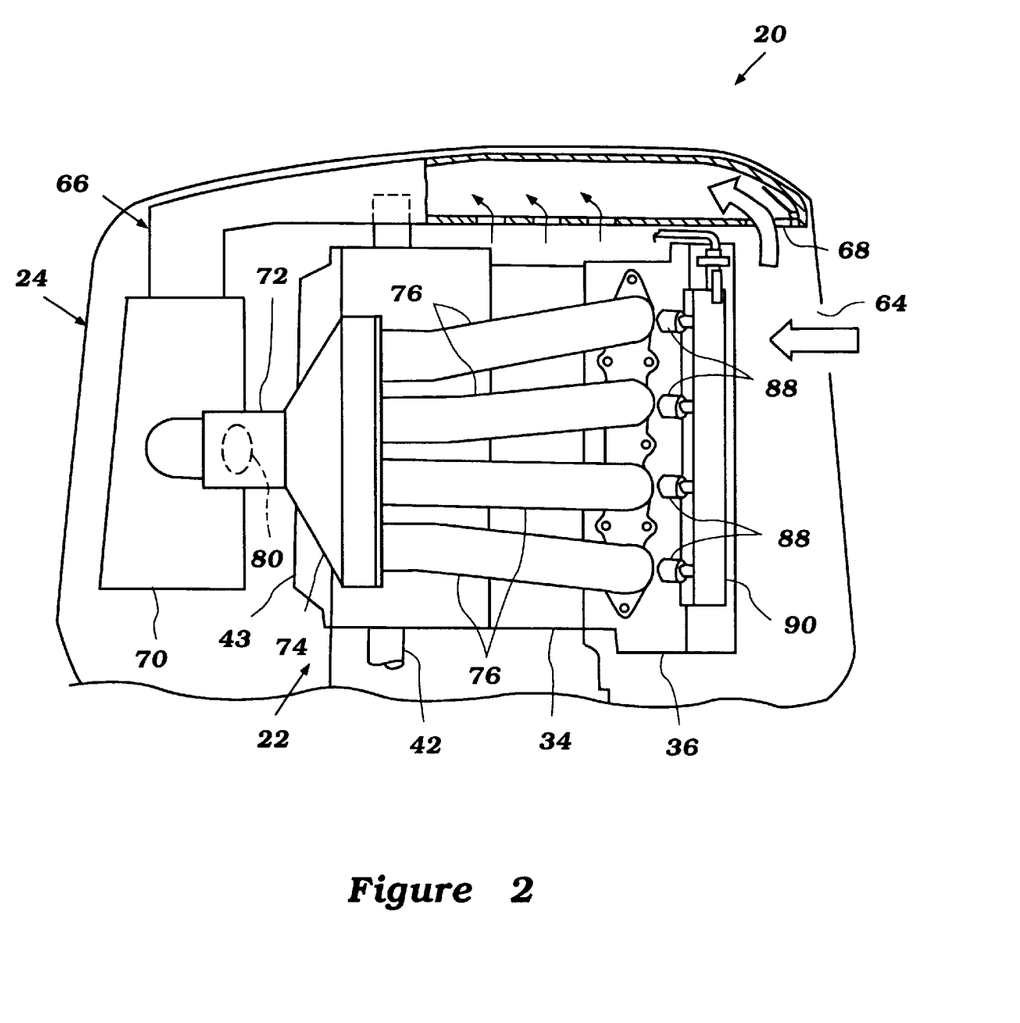
FIG. 2 is a cross-sectional view of a top portion of the motor illustrated in FIG. 1 exposing a portion of the engine positioned in a cowling thereof.

FIGS. 1 and 2 illustrate an outboard motor 20 powered by an engine 22 controlled with an engine control in accordance with the present invention. The control of the present invention is described with an engine 22 utilized to power an outboard motor 20 since this is an application with which an engine controlled with the control has particular utility. As may be appreciated by one skilled in the art, the engine control may be used to control an engine used in a variety of other applications.

In general, and as described in more detail below, the engine control of the present invention is arranged to selectively increase the air intake into the combustion chamber of the engine dependent on one or more operating conditions.

Referring to FIGS. 1 and 2, the outboard motor 20 has a powerhead which comprises the engine 22 positioned in a cowling 24. A lower unit 26 extends below the powerhead. The outboard motor 20 is connected to the hull 28 of a watercraft 30, preferably at a transom portion of the watercraft 30. The motor 20 is connected to the watercraft 30 by a clamping bracket 32. Preferably, the motor 20 is connected to the clamping bracket 32 in a manner which permits side-to-side movement about a vertically extending axis for permitting steering of the watercraft 30 with the motor, and in a manner which permits movement up and down about a horizontally extending axis for permitting trimming of the motor 30. These mountings are well known to those skilled in the art.

The engine 22 includes a cylinder block 34 having a cylinder head 36 connected thereto and cooperating therewith to define a plurality of cylinders 38, each cylinder including a combustion chamber portion 39. As is known to those skilled in the art, the engine 22 may have any number of cylinders 38.

In the present embodiment, a piston 40 is movably mounted in each cylinder 38. Each piston 40 is connected to a crankshaft 42 which is journalled for rotation with respect to the remainder of the engine 22 via a connecting rod 44. The crankshaft 42 is preferably positioned in a crankcase chamber defined by the block 34 opposite the cylinder head 36 and enclosed with a crankcase cover 43.

The crankshaft 42 is generally vertically extending, and likewise the cylinders 38 are preferably arranged in in-line fashion. As known to those skilled in the art, the engine 22 may be arranged in other orientations, such as a "V" arrangement. In addition, the engine 22 may be of the rotary type.

As illustrated in FIG. 1, the crankshaft 42 is preferably arranged to drive a drive shaft 46 which extends through the lower unit 26 of the motor 20 to drive a means for propelling water. In the embodiment illustrated, the drive shaft 46 extends to a forward-neutral-reverse transmission 50. This transmission 50 may be of a variety of types. As illustrated, the transmission 50 includes a bevel gear 52 mounted on the end of the drive shaft 46 for selective engagement with forward and reverse bevel gears 54,56 mounted on a propeller drive shaft 58. The propeller drive shaft 58 extends to the means for propelling water, which in the present invention is illustrated as a propeller 60 having at least one blade 62.

A operation device 61 is provided for permitting the operator of the watercraft 30 to shift the transmission 50 between forward, neutral and reverse positions. As illustrated, the device 61 includes a shift lever 63 moveable between F, N and R positions corresponding to forward, neutral and reverse transmission positions, respectively. The shift lever 63 is connected via a shift cable 65 to a shift rod 67 extending through the lower unit 26 of the motor 20 to the transmission 50. As illustrated, the shift rod 67 is arranged to rotate and move the forward and reverse bevel gears 54,56 into selective engagement with the bevel gear 52 on the drive shaft (or into a position in which neither gear 54,56 engages the bevel gear 52 in a neutral position).

Air is provided to each cylinder 38 for use in a fuel combustion process. Referring to FIG. 2, air is drawn through a vent 64 in the cowling 24 of the motor 20. The air entering the cowling 24 is then drawn into an inlet 68 into an intake system 66. In the embodiment illustrated, the air is routed through a passage extending across the top of the engine 22 to a surge tank 70.

Air is drawn from the surge tank 70 through a throttle body 72 and delivered into a manifold 74 which includes individual runners 76 corresponding to the combustion chamber of each cylinder 38. The rate of air flow to the cylinders 38 of the engine 22 is preferably governed by a throttle plate 80 movably mounted in a passage through the throttle body 72. This plate 80 is preferably remotely movable by the operation device 63 of the watercraft 30 from a position in which the plate 80 generally obstructs the passage and other positions in which the throttle plate 80 generally does not obstruct the passage.

Each runner 76 has a passage 82 therethrough leading to an intake port of a cylinder 38. As illustrated in FIG. 1, means are provided for controlling the timing of the flow of air into each cylinder 38. Preferably, this means comprises an intake valve 84 having one end positioned in the intake port. The valve 84 is preferably actuated between one position in which is obstructs or closes the port and a second position in which the port is opened by an intake camshaft 86.

Preferably, the intake camshaft 86 is arranged to actuate the intake valve 84 corresponding to all of the cylinders 38. Means are provided for driving the camshaft 86, as well known in the art. For example, this means may comprises a chain or belt extending from the crankshaft 42 to the camshaft 86 whereby the crankshaft 42 drives the camshaft 86.

Fuel is also supplied to the cylinder 38 for combustion therein. Preferably, the fuel is supplied through a suitable charge former, such as a fuel injector 88. As illustrated, a fuel injector 88 is provided corresponding to each runner 76 and delivers fuel into the air passing through the passage 82 corresponding thereto.

Fuel is supplied to each fuel injector 88 by a fuel supply system which preferably includes means for delivering fuel from a supply to the injector 88 at high pressure. The fuel is preferably supplied to the injectors 88 through a fuel rail 90 extending generally vertically along the cylinder head 38 of the engine 22.

Products of the combustion process are routed from each cylinder 38 through an exhaust port leading to an exhaust passage 92. The exhaust passage 92 leading from each cylinder 38 preferably extends to a common exhaust passage 94 leading to a point external to the motor 20.

Means are provided for controlling the flow of exhaust from each cylinder 38 to its respective exhaust passage 92. Preferably, this means comprises an exhaust valve 96 having one end positioned in the exhaust port. The exhaust valve 96 is moveable between a first position in which it obstructs or closes the exhaust port and prevents the flow of exhaust therethrough, and a second open position in which exhaust is permitted to flow from the cylinder 38 to the exhaust passage 92. Preferably, the valve 96 is actuated by an exhaust camshaft 98. The camshaft 98 is preferably driven in like manner to the intake camshaft 86.

The details of the remainder of the exhaust system are not provided herein as they form no part of the present invention, and are well known to those skilled in the art.

The engine 22 preferably includes a cooling system as is also well known in the art and will not be described in any further detail.

The engine 22 includes an engine control unit for controlling various engine functions. Preferably, the engine control is of the type which receives information from various sensors and utilizes the data from the sensor to control the engine functions. As illustrated in FIG. 1, a throttle plate sensor 100 preferably provides data regarding the position of the throttle plate 80 to an ECU 102 of the engine control. An idle sensor or switch 104 is arranged to indicate to the ECU 102 when the throttle plate 80 is moved to an idle position, i.e., a position in which the plate 80 generally obstructs the passage, restricting the flow of air and slowing the engine speed.

An intake air pressure sensor 106 in communication with the intake system 74 provides air pressure data to the ECU 102. A crankshaft angle sensor 108 is provided for monitoring the speed and angle of the crankshaft 42, and a cylinder distinguishing sensor 110 is preferably provided for determining the position of the piston 40 of at least one of the cylinders 38. As is known to those skilled in the art, by knowing the position of one of the pistons 40 and the angular position of the crankshaft 42 it is possible to determine the position of the piston of every cylinder 38 of the engine 22.

An operation device speed sensor 112 is provided for sensing the speed at which the operation device is moved into the F, N or R positions and sending the speed data to the ECU 102.

A shift position sensor 113 is provided for determining the rotational position of the shift rod 67 for providing shift position data to the ECU 102. As may be understood, the shift rod 67 does not have such distinct positions corresponding to the shift positions as does the shift lever 63. As such, this sensor 113 generally provides wherein the rotational position of the rod with respect to the sensor 113 results in a linear signal output.

A watercraft speed sensor 114 provides data to the ECU 102 regarding the speed of the watercraft 30. A trolling mode sensor 115 provides data indicating the trolling mode to the ECU 102.

Based on the sensor data, the ECU 102 controls an ignition circuit 116 which triggers an ignition coil 118 for firing of a spark plug 120 corresponding to each cylinder 38. In this manner, combustion within each cylinder 28 is controlled.

Also included in this invention, as seen in FIG. 1, is an air intake adjustment means generally referenced by the numeral 200. The air intake adjustment means forms a by-pass in the throttle body 72 so that even when the throttle plate 80 is completely closed air can pass through the by-pass and maintain engine idle speed. The air intake adjustment means 200 is comprised of a air bypass line 202 which, as previously stated forms an air by-pass in the throttle body 72 around the throttle plate 80. An air intake adjustment valve means 204 is in fluid communication with the by-pass line 202. The adjustment valve 204 is capable of being opened and closed and regulates the air flow through the line 202.

Preferably, the adjustment valve is in communication with the ECU 102 and is opened or closed by the ECU dependent upon predetermined conditions which will be discussed more fully below.

Figure 3:
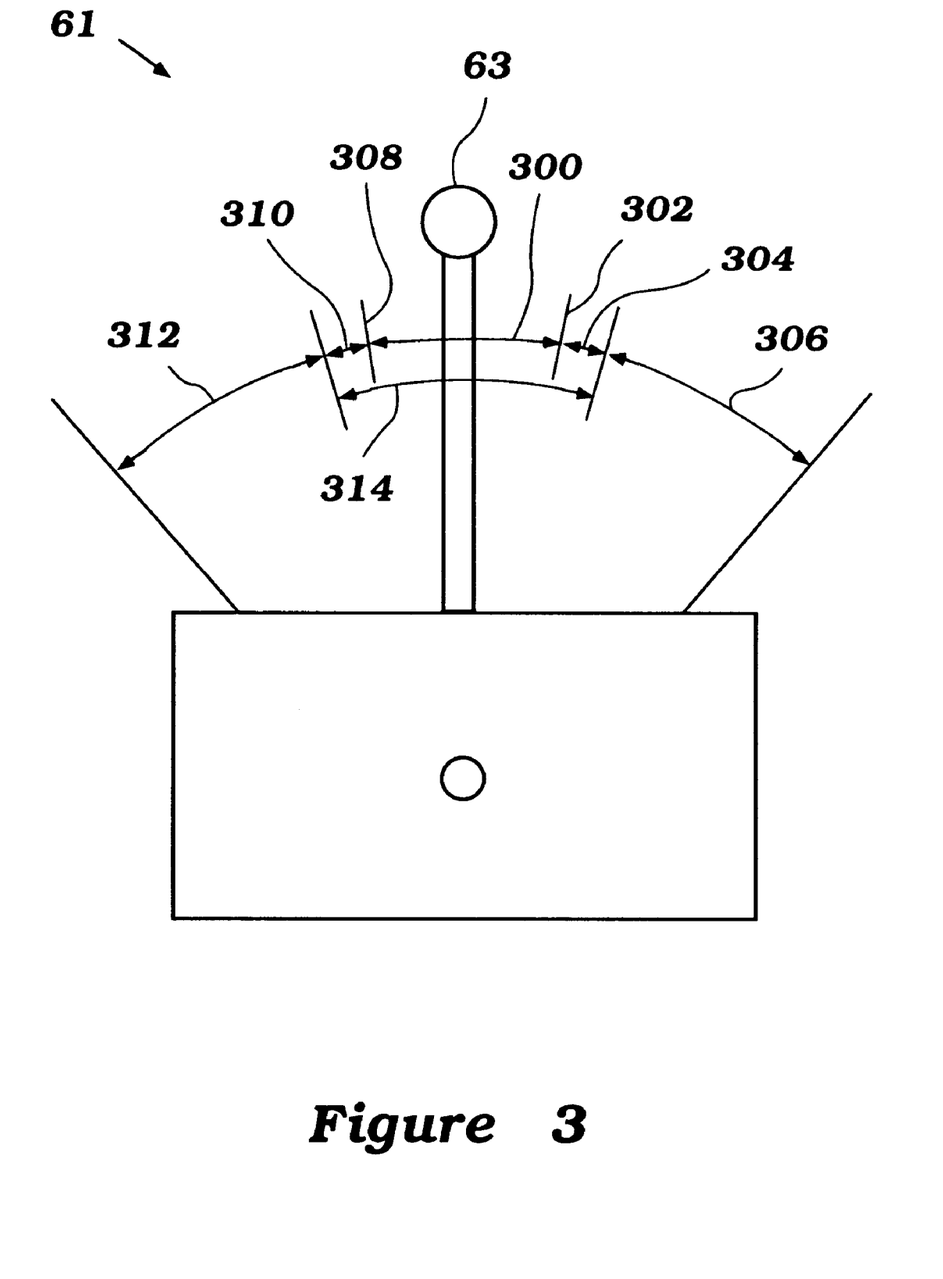
FIG. 3 schematically illustrates the operation device and the various regions of travel of the operation device.

FIG. 3 illustrates the different ranges of the operation device 61 and the various modes of operation for different positions of the shift lever 63. The full range of travel of the shift lever 63 is shown by the arc which will be described more fully below. As illustrated in this figure, the shift lever 63 is shown in the neutral position 300. The neutral position is preferably limited to the range of travel by the arc 300 in both the forward and the rearward direction. In the neutral position the transmission 50 is typically not engaged.

As the operator of the watercraft moves the shift lever 63, the clutch mechanism will engage. For instance, when the shift lever 63 is moved toward the right in FIG. 3, the clutch will be in a first position 302. If the shift lever 63 is continued to be moved into a range 304 where the clutch is starting to engage the transmission 50 thereby driving the watercraft in a rearward direction. The range 304 is preferably the position of the shift level 63 where the throttle plate 80 will be substantially closed and air may pass through air adjustment means 200, to increase the idle speed, as is more fully described below. If the operator continues in that direction the shift lever 63 will continue into a range 306. When the shift lever 63 is in the 306 range the transmission is fully engaged in the reverse mode.

In the alternative if the operator of the watercraft pulls the shift lever to left on FIG. 3 the transmission 50 will not start to be engaged until the lever is out of the neutral range 300. Preferably, at the end of the neutral range, in the forward mode 308, the clutch of the transmission will initially be engaged. As before, there is then a range 310 where the transmission 50 enters into a mode where the watercraft is propelled in a forward direction. The range 310 is preferably the position of the shift level 63 where the throttle plate 80 will be substantially closed and air may pass through air adjustment means 200, to increase the engine speed, as is more fully described below. During the range identified by 312 the transmission 50 is fully engaged and is propelling the watercraft forward through the water.

For both the forward and reverse operations of the shift lever 63 the engine 20 is operating at an idle speed throughout the range 314. The load on the engine, during the time in which the transmission is engaged, will change and the idle speed may be adjusted by the air intake adjustment means as will be described more fully below.

Figure 4:
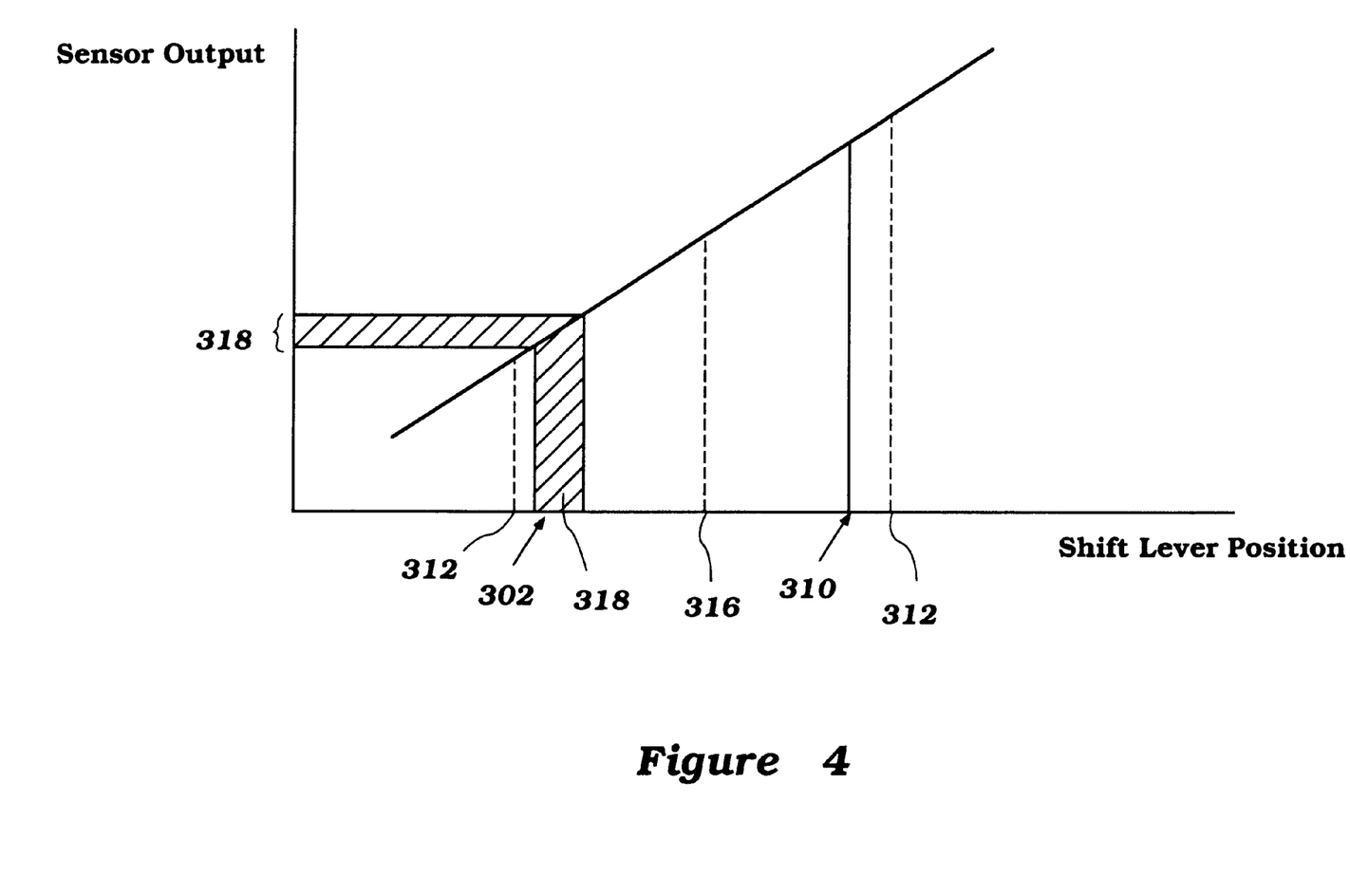
FIG. 4 graphically illustrates the operation device sensor output versus the operation device position of an engine of FIG. 1.

FIG. 4 graphically illustrates one scenario when the idle speed is adjusted to compensate for the increased load on the engine. In this graph the shift lever position is illustrated on the horizontal axis and the sensor output is located on the vertical axis. In this figure the center of the neutral position 300 is numbered 316. The point at which the transmission is initially engaged in to propel the watercraft in a forward direction is 310 and the transmission is fully engaged at 312 on FIG. 4.

Likewise the transmission is initially engaged in the reverse position at 302 and fully engaged at 312. In order to compensate the idle engine speed, the sensor 113 must detect the movement of the shift lever 63 at time before the transmission is engaged in the shaded region 318. Thus, when the operation means 61 is being moved from a position in the neutral range 300 to the position toward a position where a clutch will be engaged the sensor 113 will output a signal to the ECU 102. Preferably, the sensor 113 will output a signal when the shift lever 63 is in the ranges 304, 310. The ECU can then send a signal to open valve means 204 increasing the air flow through the by-pass 202 thereby increasing the engine speed to compensate for the additional loading.

Figure 5:
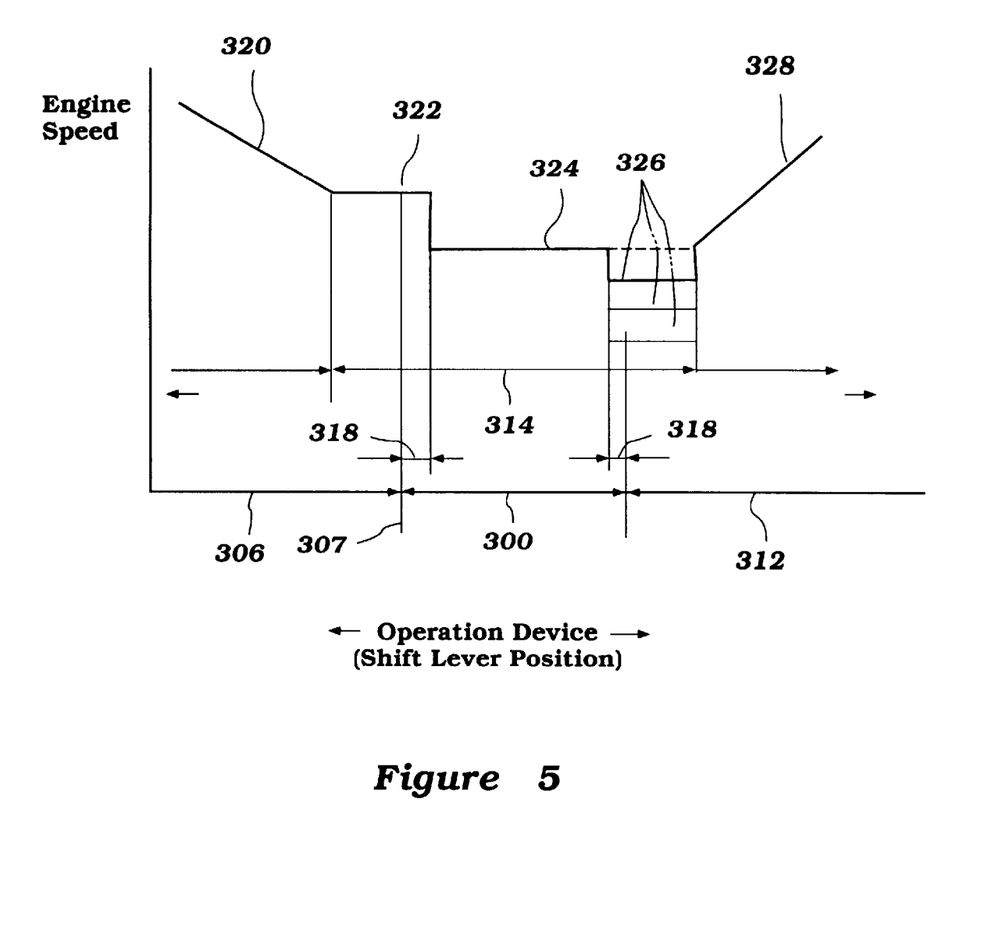
FIG. 5 graphically illustrates the engine speed versus operation device position.

FIG. 5 graphically illustrates the engine speed on the vertical axis with the upward direction noting an increase in engine speed. This figure illustrates when the engine speed will be adjusted by the air intake adjustment mean 200. One range of engine speed denotes the engine speed when the watercraft is traveling in a reverse direction as shown by reference numeral 320. During this range of engine speed as the lever 63 is moved into the range 306 the throttle 80 is opening and allowing more air into the combustion chamber 39 resulting in increased engine speed.

In the next range of engine speed illustrated in FIG. 5 is the braking region referenced by 322. When the watercraft is in the braking range 322 the throttle 80 is closed as it is in the idle range 314. The engine speed, however, is increased above the idle speed 324 by the air intake adjustment means 200 allowing a greater volume of air to flow through the by pass 202. The engine speed is increased at time 318 before the clutch of the transmission is initially engaged at 302 to prevent the engine from bogging down or stalling under the increased load on the motor when it is used to slow the watercraft In the range 324 the engine speed is constant and the throttle 80 is closed and the shift lever is in the neutral position 300. The air intake adjustment means is not opened during this time and no air is flowing through the by-pass 202.

In the trolling range designated by 326 the engine speed is dropped below the idle range 324. Preferably in order to be in a trolling mode the operator of the watercraft must depress a button or switch and idle speed is lowered to allow the boat to troll at a very slow rate of speed.

In the full forward driving range 328 the throttle 80 is opened and the transmission 50 is fully engaged. As the shift lever 63 is advanced the throttle 80 is opened further and the engine speed increases.

Figure 6:
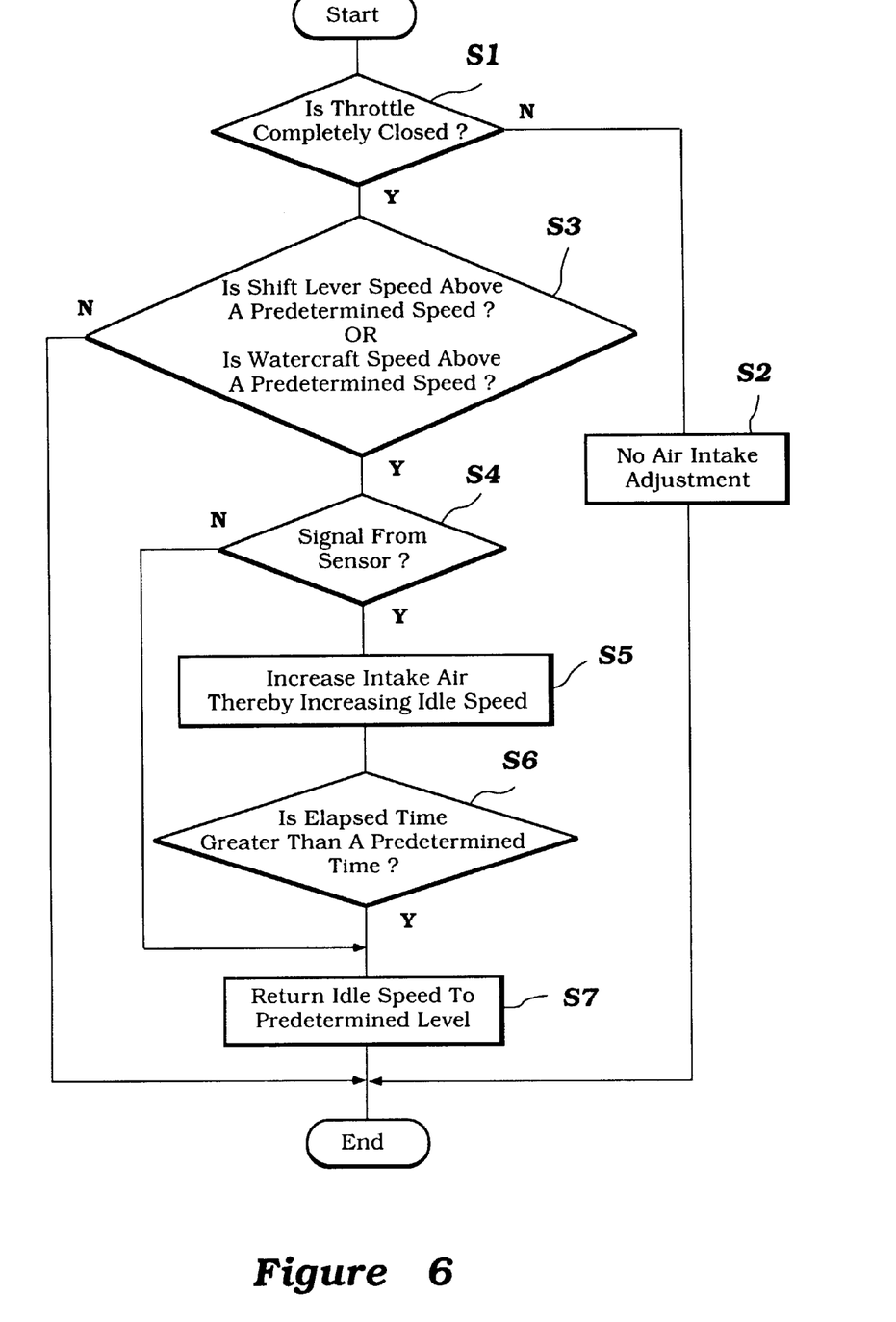
FIG. 6 schematically illustrates a control strategy for the control of the present invention.

FIG. 6 illustrates an algorithm for how the ECU 102 determines if the air intake adjustment 200 should be utilized. S1 determines if the throttle is completely closed by monitoring the output of the idle switch 106. If the throttle is not completely closed the air intake adjustment 20 is not utilized, S2, and the algorithm ends. If, however, the throttle 80 is entirely closed the algorithm progresses to S3.

S3 determines if the lever 63 is moved at a rate above a predetermined rate based upon the output of the operation device speed sensor 112. S3 also determines if the watercraft speed is above a predetermined speed based upon the output of the watercraft speed sensor 114. If both conditions are not satisfied the algorithm ends. If, however, either or both conditions are satisfied the algorithm progresses to S4.

At S4 it is determined if there is an output signal from the shift lever sensor 113 to determine if the shift lever 63 is in the range 318. If the shift lever 63 is in the range 318 an output signal is sent to the ECU 102 and the algorithm proceeds to S5. If there is no signal from the sensor 113 the algorithm proceeds to S7. In accordance with step S5, the air intake adjustment 200 allows air into the bypass line 202 and thereby the flow of air through the passage 76 thereby increasing the engine speed.

S6 then follows S5. In S6, the elapsed time that the air intake adjustment 200 increases the engine speed is compared to that of a predetermined value. When the time that the air intake speed is increased is greater than a predetermined time the algorithm proceeds to S7.

At step S7 the engine speed is returned back to a predetermined idling speed by cutting off flow through the by pass line 202 by closing valve 204. After S7 the algorithm ends.

Figure 7:
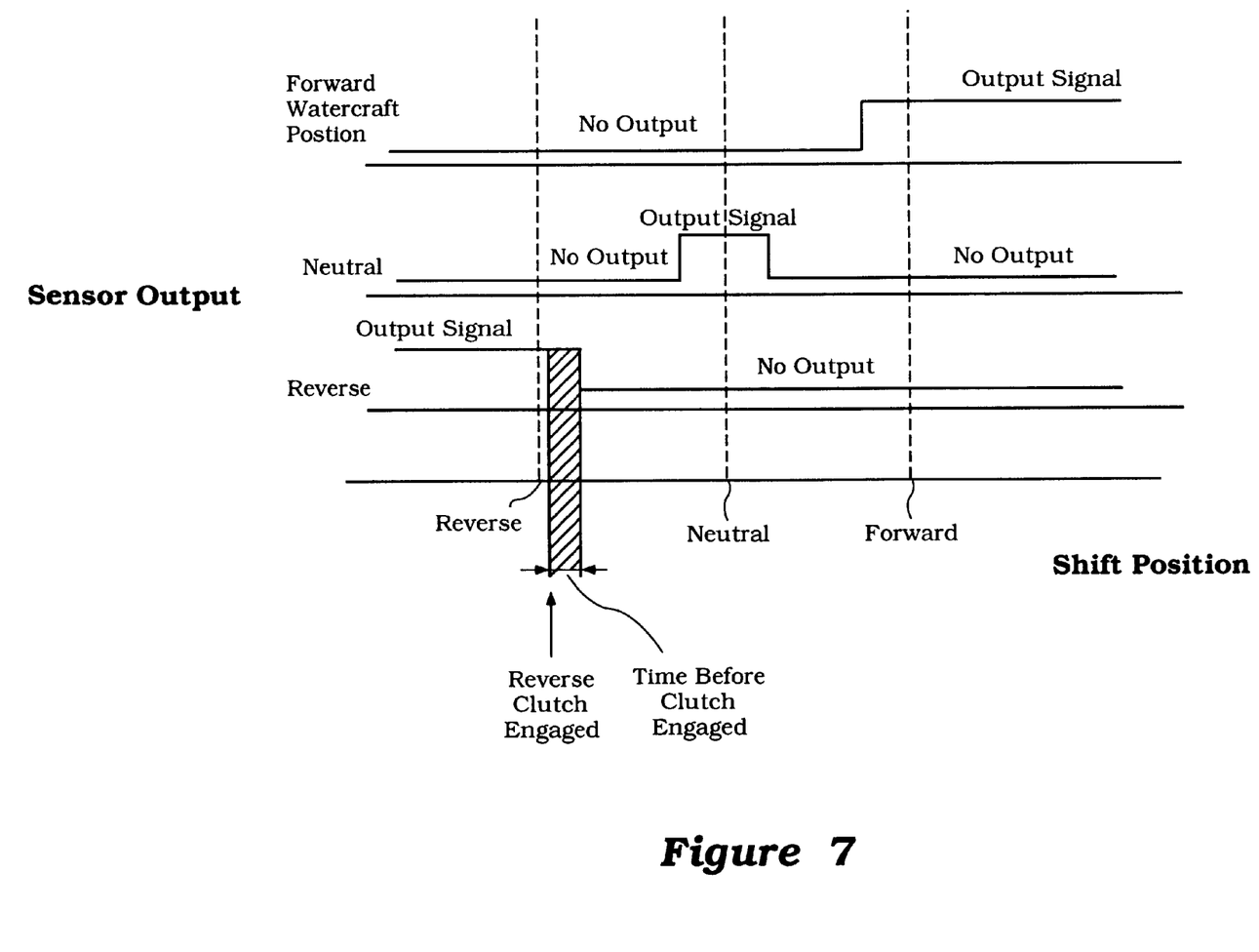
FIG. 7 graphically illustrates the output of a plurality of sensors versus the operation device position.

FIG. 7 illustrates the output of the sensor 113. As illustrated, prior to the time when the shift lever 63 is in a position where the transmission is engaged the sensor outputs a signal. Likewise, the sensor 113 outputs a signal at a time prior to the time in which the reverse clutch is engaged and the load on the engine is increased. Finally, the sensor outputs a signal when the shift lever 63 is in a neutral position which can be used to indicate a throttle completely closed position.

Although not shown other algorithms can be employed by the ECU for sensing other conditions at which the engine speed may too low for the associated load on the engine. For instance, the operator of the watercraft may use the engine to brake when operating the watercraft in a rearward direction and moves the shift lever 63 to a forward direction. In such a situation, an analogous algorithm of FIG. 6 may be utilized. The main difference between this algorithm and that of FIG. 6 would lie in the S4. The S4 for this operation would check the output of the sensor 113 to determine if there was an output signal, illustrated in FIG. 7, transmitted to the ECU 102. If there was an output signal, the algorithm would increase the engine speed by having the ECU 102 signal the air intake adjustment means 200 thereby opening the valve 202 and allowing air flow through the by-pass 204. As before, the engine speed would only be increased for the predetermined period of time before returning to a predetermined idle speed.

Yet another modification to the algorithm of FIG. 6 could be used to increase the idle speed when the ECU 102 sensed that the engine speed is decelerating a rate that may bog down or even stall the engine. In this modification of the algorithm S1 and S3 may be, but need not be included. Further, S4 would monitor the output from an engine speed sensor 108 and if the engine speed was below a predetermined speed, the ECU 102 would send signals to the air intake adjustment means 200 and the air flow through the by-pass would increase and subsequently to prevent the engine from bogging down and or stalling.

Still another modification to the algorithm of FIG. 6 could be used to modify the engine idle speed during a trolling mode in order to prevent the engine speed from decreasing into a speed where it would bog down or stall. In this mode S1, S2 or S3 may still be included, however, it is not imperative. In this operation, S4 would also monitor a trolling sensor 115 to determine if the operator of the watercraft was in a trolling mode. The trolling mode is marked by a decreased idle speed as shown in FIG. 5. Also in this mode, the S4 could include monitoring of the engine speed sensor 108 to determine if the engine speed fell below a predetermined range in which the engine speed would bog down or stall. If the engine speed sensor indicated an engine speed outside of the predetermined range. The ECU 102 would send a signal to the air intake adjustment 200 and allow the engine speed to increased by opening the valve 204 and allowing more air through the bypass line 202. Once the engine speed is stabilized the valve 204 can be closed and trolling idle speed is maintained.

In an alternative arrangement, the intake may be provided with only a throttle valve 80. In this arrangement there would be no by-pass passage 202 or valve 204. Instead, the air intake adjustment means would consist of a throttle override mechanism (not shown). The throttle override mechanism would be controlled by the ECU 102 to adjust the position of the throttle plate 80 when the predetermined conditions as described above were satisfied thereby increasing the flow of air into the passage 76 and increasing the engine speed.

Of course, the foregoing description is that of preferred embodiments of the invention, and various changes and modifications may be made without departing from the spirit and scope of the invention, as defined by the appended claims.

What is claimed is:

1. An engine control system for an internal combustion engine for propulsion of an associated watercraft, said engine including an air intake in communication with a combustion chamber of said engine, an air intake adjustment means for altering the amount of air let into said combustion chamber of said engine comprised of first and second independently operated air intake adjustment devices, an operation device controlling a water propulsion device of said watercraft said device movable between a forward, a neutral or a reverse position, a first control means for controlling said first air intake adjustment device based upon the position of said movable operating device, a second control means for controlling said second air intake adjustment device independent of said first control means based upon a set of predetermined conditions.

2. An engine control system of claim 1 wherein said first air intake adjustment device comprises a throttle valve in said air intake.

3. An engine control system of claim 2 wherein said second air intake adjustment device comprises an air intake bypassing said throttle valve.

4. An engine control system of claim 1 wherein said first air intake adjustment device comprises a primary intake with an adjustable valve therein and said second air intake adjustment means comprises a secondary passage with an adjustable valve therein.

5. An engine control system of claim 1 wherein said second control means adjusts said second air intake adjustment device to increase the amount of air let into said combustion chamber of said engine for a period of time before or substantially at a time in which said operation device is moved from said forward position to said reverse position.

6. An engine control system of claim 1 wherein said second control means adjusts said second air intake adjustment device to increase the amount of air let into said combustion chamber of said engine for a period of time before or substantially at a time in which said operation device is moved from said reverse position to said forward position.

7. An engine control system of claim 1 further including a watercraft speed detector for monitoring a current speed of said watercraft in communication with said second control means and wherein said second control means adjusts said second air intake adjustment device to increase the amount of air let into said combustion chamber of said engine for a period of time before or substantially at a time in which said operation device is moved from said forward position to said reverse position and said current speed of said watercraft is above a predetermined level.

8. An engine control system of claim 7 further including an operation device speed sensor means for monitoring the speed of movement of said operation device in communication with said second control means.

9. An engine control system of claim 8 wherein said predetermined condition includes movement of said operation device above a predetermined speed.

10. An engine control system of claim 9 wherein said second control means adjusts said second air intake adjustment device to increase the amount of air let into said combustion chamber when said movement of said operation device is above a predetermined speed.

11. An engine control system of claim 10 wherein said second control means adjusts said second air intake adjustment device to increase the amount of air let into said combustion chamber for a period of time when or immediately before said operation device is moved from said forward position to said reverse position at a speed greater than a predetermined speed.

12. An engine control system of claim 1 further including an engine speed sensor in communication with said second control means.

13. An engine control system of claim 12 wherein said predetermined condition includes said engine speed slowing at a rate faster than a predetermined rate.

14. An engine control system of claim 13 wherein said second air intake adjustment device adjusts said air intake adjustment means to allow the increase the intake of air into said combustion chamber of said engine when said engine speed is slowing at a rate faster than a predetermined rate.

15. An engine control system of claim 1 further including a trolling mode sensor for detecting if said engine is operating in a trolling mode in communication with said second control means.

16. A engine control system of claim 15 wherein said predetermined condition includes detection of said trolling mode of said engine and said operation device is in said neutral position and said second control means adjusts said second air intake adjustment device to increase the intake of air into said combustion chamber of said engine.

17. A method of operating an internal combustion engine of a watercraft including an air intake in communication with a combustion chamber of said engine, main throttle air intake adjustment means for adjusting the air flow in said intake member and to said combustion chamber of said engine and an idle air intake adjustment means for bypassing said main throttle air intake adjustment means for controlling idle air flow and control means for the adjustment of said air intake adjustment means comprising of the steps of increasing the air flow into said main throttle air intake adjustment means and to said combustion chamber of said engine dependent on said position based upon a position of an operating device movable in a forward, a neutral and a reverse position and for controlling said idle air intake adjustment means based on a predetermined condition.

18. A method of claim 17 wherein said predetermined condition includes moving said operation device from said forward position to said rearward position.

19. A method of claim 18 wherein said predetermined condition includes detecting if said watercraft speed is above a predetermined level.

20. A method of claim 19 wherein said predetermined condition includes detecting if the speed of movement of said operation device is above a predetermined level.

21. A method of claim 17 wherein said predetermined condition includes moving said operation device from said rearward position to said forward position.

22. A method of claim 21 wherein said predetermined condition further includes detecting if said watercraft speed is above a predetermined level.

* * * * *